J. C. GASKILL.
GOVERNOR FOR STEAM ENGINES.
APPLICATION FILED JAN. 19, 1912.
1,045,541.
Patented Nov. 26, 1912.
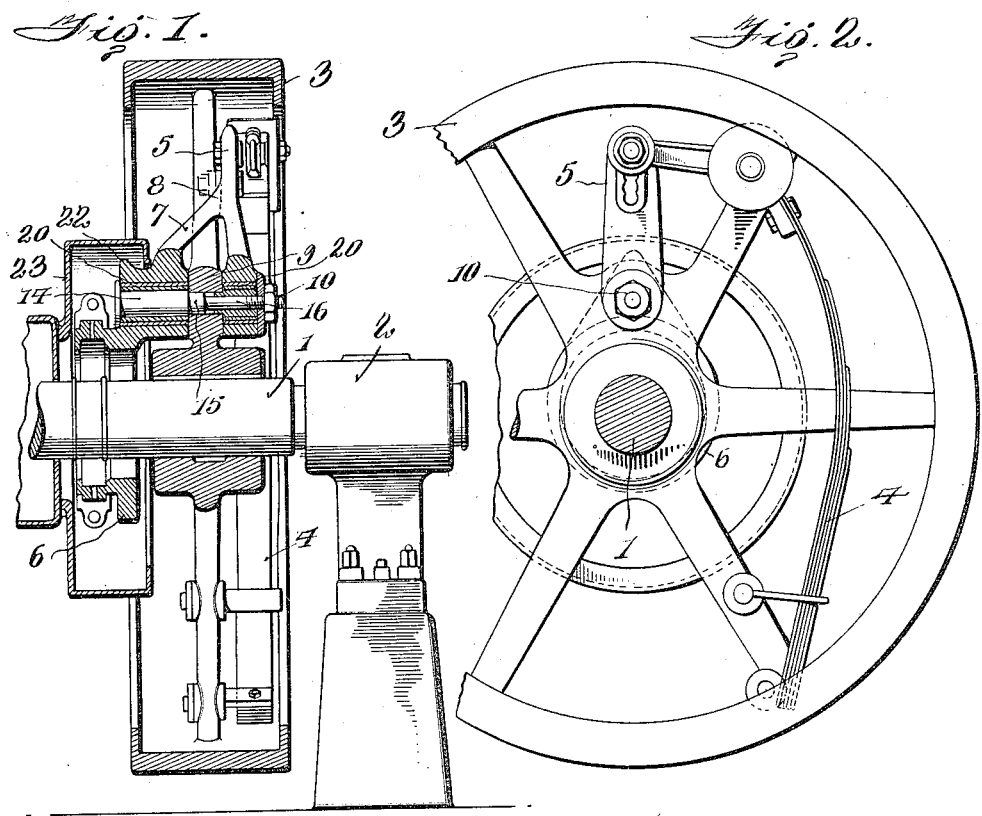
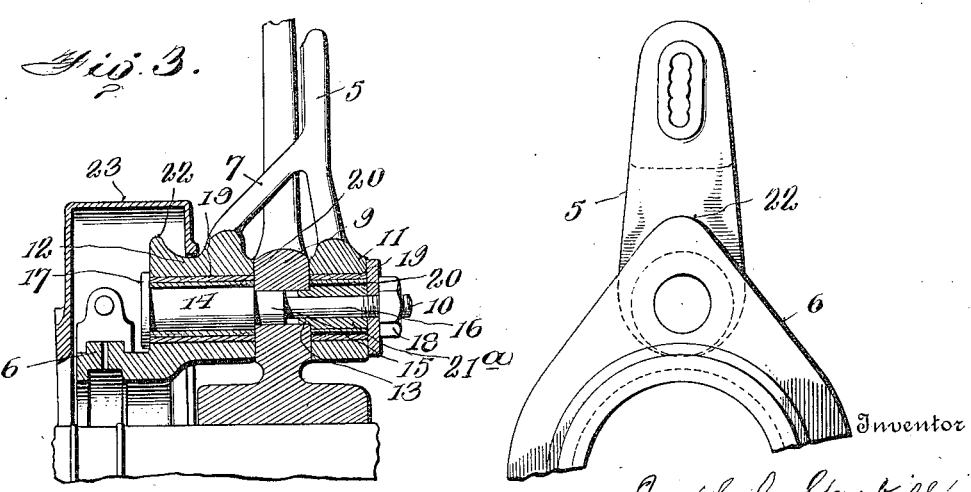

UNITED STATES PATENT OFFICE.

JOSEPH C. GASKILL, OF OSWEGO, NEW YORK, ASSIGNOR TO AMES IRON WORKS, OF OSWEGO, NEW YORK, A CORPORATION OF NEW YORK.

GOVERNOR FOR STEAM-ENGINES.

1,045,541.  Specification of Letters Patent.  Patented Nov. 26, 1912.

Application filed January 19, 1912. Serial No. 672,128.

*To all whom it may concern:*

Be it known that I, JOSEPH C. GASKILL, a citizen of the United States, residing at Oswego, in the county of Oswego and State of New York, have invented a certain new and useful Governor for Steam-Engines, of which the following is a specification.

This invention relates, generally, to steam engines, and, particularly, to the eccentrics used in connection with the speed controlling devices of such engines, and it has for its object to provide means for supporting a governor eccentric which will insure an even wear to both the journal and bearing of the eccentric, and it consists in the parts and combinations of parts hereinafter described and claimed.

In the accompanying drawings, forming a part of this specification, Figure 1 is a vertical section through a fly wheel and main bearing, showing my invention in place thereon. Fig. 2 is a side elevation of a fly wheel showing my invention in position thereon. Fig. 3 is an enlarged detail sectional view, Fig. 4 is an enlarged detail view in side elevation of a fragment of the eccentric and its arm.

Referring to the drawing in which similar reference characters indicate similar parts, the numeral 1 designates a crank shaft which is suitably journaled in bearings, one of which is shown at 2, and having mounted thereon a fly wheel 3. To the fly wheel is secured a governor element, in this instance, consisting of a spring 4, one end of which is secured to the fly wheel and the other end connected with the lever arm 5 of a swinging eccentric 6 and through which connection the valve of the engine is controlled. The eccentric is cast with the lever arm 5 and from this arm, 5, an arm 7 extends. The arms 5 and 7 may be, and preferably are, formed integral, but they may be formed in separate parts and rigidly secured or joined together, as indicated in dotted lines at 8. The arms 5 and 7 are spaced apart or diverge from their juncture to their extremities so as to straddle the wheel boss 9, which carries the pivotal pin or shaft 10, and fit accurately thereagainst. The arms, 5 and 7, are enlarged, as at 11 and 12, and the enlargements bored to receive the shaft or pin 10, and in line with the opening 13 in the boss 9. The pin or shaft 10, is formed in three diameters, 14, 15, and 16, and is formed with a head 17 and a threaded end to receive a nut 18. Into the openings in the lever arms bushings 19 are tightly driven and at one end of the pin or shaft 10 the bushing 20 is interposed between the bushing 19 and shaft or pin and is free to revolve. At the other or smaller end of the shaft a bushing 21 is fitted snugly thereover and is reduced so as to project slightly into the hole or opening in the wheel boss in order to center the pin or shaft, and between said bushing 21 and the bushing 19, a bushing 21$^a$ is interposed and is free to revolve. The purpose of building up the pivotal pin or shaft by means of the bushings described is to reduce friction to a minimum and to insure uniform wear of the parts, while a smooth and free action of both the swinging or oscillating and revolving connections is attained under all conditions arising in operation.

The eccentric is formed or provided with a projection 22 at its point of junction with the arm 7 and the eccentric is entirely inclosed by an oil guard or casing 23, so that the lubricating oil, which clings to the surfaces leading to the highest point while the eccentric is in motion, will be thrown off the projection 22 and caught by the oil guard or casing. Thus by supporting the eccentric by means of two bearings longitudinally in alinement, but spaced apart, uniform wear of the bearings or its journal is assured and the original alinement of the eccentric maintained. Also this construction permits the use of the wide oil guard or casing, 23, as the projecting arms allow the guard to be built in wide toward the center of the wheel and thus cover the eccentric and strap completely so that the oil does not gradually work out and onto the fly wheel from which it is thrown on the walls and floor of the engine room.

What I claim is:

1. A governor, comprising an eccentric pivotally supported from a plurality of bearings in longitudinal alinement with each other.

2. A governor, comprising an eccentric, a pivotal shaft or pin for said eccentric, and means for pivotally supporting said eccentric from said shaft or pin at separated points.

3. A governor, comprising an eccentric, a pivotal pin or shaft for said eccentric, and arms carried by said eccentric and pivotally mounted on said pin or shaft.

4. A governor, comprising an eccentric, a pin or shaft for said eccentric, and diverging arms carried by said eccentric and pivotally mounted on said shaft or pin.

5. A governor, comprising an eccentric having two arms, said arms being formed with openings in alinement, and a pivotal pin or shaft for said arms.

6. In an engine, comprising a fly wheel, and a governor element, an eccentric, a lever carried by said eccentric, said lever being adapted to straddle the web or boss of the fly wheel and pivotally connected therewith at each side.

7. An engine, comprising a fly wheel, a governor element, and an eccentric connected with said element and having an elongated peripheral projection.

In testimony whereof, I affix my signature, in the presence of two witnesses.

JOSEPH C. GASKILL.

Witnesses:
F. H. CORREGAN,
J. J. DOYLE.

Copies of this patent may be obtained for five cents each, by addressing the "Commissioner of Patents, Washington, D. C."